United States Patent
Engel

(10) Patent No.: US 7,692,648 B2
(45) Date of Patent: Apr. 6, 2010

(54) SYSTEM AND METHOD FOR EMPTY SPACE SKIPPING IN SLIDING TEXTURE BASED VOLUME RENDERING BY TRIMMING SLAB POLYGONS

(75) Inventor: Klaus Engel, Donauwörth (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 642 days.

(21) Appl. No.: 11/599,783

(22) Filed: Nov. 15, 2006

(65) Prior Publication Data

US 2007/0165026 A1      Jul. 19, 2007

Related U.S. Application Data

(60) Provisional application No. 60/759,884, filed on Jan. 18, 2006.

(51) Int. Cl.
*G06T 15/40*     (2006.01)
(52) U.S. Cl. ...................................................... 345/421
(58) Field of Classification Search ........................ None
See application file for complete search history.

(56) References Cited

U.S. PATENT DOCUMENTS 6,674,430 B1 * 1/2004 Kaufman et al. ............ 345/424
6,690,371 B1 * 2/2004 Okerlund et al. ............ 345/424
2005/0264578 A1 * 12/2005 Engel et al. .................. 345/582
2007/0035539 A1 * 2/2007 Matsumura et al. ......... 345/419

OTHER PUBLICATIONS

U.S. Appl. No. 11/132,541 entitled "Sliding Texture Volume Rendering," filed May 19, 2005.
U.S. Appl. No. 11/481,129 entitled "System and Method for Interleaved Slice Volume Rendering," filed Jul. 5, 2006.

\* cited by examiner

*Primary Examiner*—Ulka Chauhan
*Assistant Examiner*—Said Broome
(74) *Attorney, Agent, or Firm*—Donald B. Paschburg; F.Chau & Associates, LLC

(57) ABSTRACT

A method for volume rendering a digitized image includes providing a pair of adjacent 2-dimensional images of texture data, identifying a plurality of polygons extending in slabs between said adjacent two dimensional textures, and finding the first and last visible voxel for the data rows and data columns of each said polygon. The minimum and maximum bounds of each data row and for each data column are determined, those data rows and data columns that do not contain any visible voxels are marked as invisible, and the polygons are rendered along a direction orthogonal to a dominant viewing direction, wherein rendering of texture data is restricted by the outer bounds of polygons that are trimmed to the minimum and maximum bounds of two neighboring data rows or data columns, and wherein those data rows and data columns marked as invisible are skipped.

20 Claims, 5 Drawing Sheets

SYSTEM AND METHOD FOR EMPTY SPACE SKIPPING IN SLIDING TEXTURE BASED VOLUME RENDERING BY TRIMMING SLAB POLYGONS

CROSS REFERENCE TO RELATED UNITED STATES APPLICATIONS

This application claims priority from: "SYSTEM AND METHOD FOR EMPTY SPACE SKIPPING IN SLIDING-TEXTURE BASED VOLUME RENDERING BY TRIMMING SLAB POLYGONS", U.S. Provisional Application No. 60/759,884 of Klaus Engel, filed Jan. 18, 2006, the contents of which are incorporated herein by reference.

TECHNICAL FIELD

This invention is directed to volume rendering of digitized volumetric images.

DISCUSSION OF THE RELATED ART

This invention is a performance optimization for this inventor's sliding texture invention, "Sliding Texture Volume Rendering", U.S. Patent Application Publication No. 2005/0264578, filed May 19, 2005, and "System and Method for Interleaved Slice Volume Rendering", U.S. patent application Ser. No. 11/481,129, filed Jul. 5, 2006, the contents of both of which are incorporated herein by reference.

The technique of direct volume rendering of a three-dimensional array of data is well known in the art. Sliding texture volume rendering allows for direct volume visualization of a large three-dimensional volume data set composed of a series of parallel images. The series of parallel images contains data values representing the interior of a three-dimensional volume, such as data from Computed Tomography (CT) or Magnetic Resonance Imaging (MRI) scanners. The method works by progressively sliding over the series of images, rendering the space between the two current adjacent images. For that purpose, two adjacent images of the volume are copied into two 2D memory arrays residing in CPU or GPU (Graphics Processing Unit) memory. The space in between the two images is rendered by a CPU or GPU by rasterizing slab polygons that are textured using interpolated voxel values obtained from the two images of the volume. A slab is the space in between two adjacent volume slices, which are usually oriented orthogonally to the z-axis.

Interleaved slice volume rendering is an extension of sliding texture volume rendering, which typically interleaves four subsequent volume data slices into a single 2D RGBA texture. This allows obtaining a tri-linear interpolated sample inside the volume with a single data lookup, instead of two lookups in sliding texture volume rendering, and a small number of arithmetic operations. Slab polygon geometry is rendered for the space in between four adjacent volume slices, thus the number of slab polygons is reduced by a factor of three compared to the original sliding texture volume rendering algorithm.

Interpolated volume voxel values are usually not rendered directly. Instead, a transfer function usually maps values from the volume to colors and opacities. Depending on the opacity values in the transfer function specified by the user, parts of the volume become visible or are completely transparent. To optimize the performance during rendering, a common technique is to skip regions of the volume that become empty after applying the transfer function. Known algorithms, such as block-based empty space skipping techniques, are not optimal for sliding texture volume rendering, since the volume is decomposed into slabs that are again decomposed into slab polygons. Another block-based decomposition of the volume on top of the slab-based decomposition would additionally increase the already large number of slab polygons. Thus, it would be more efficient to trim the slab polygon geometry for empty space-skipping.

SUMMARY OF THE INVENTION

Exemplary embodiments of the invention as described herein generally include methods and systems for improving the performance of the sliding-texture based volume rendering method by trimming slab polygons to allow empty space skipping. For each data row or data column, which are usually oriented along the x- and y-directions inside the volume, the first and last visible (non-transparent) voxel, depending on the transfer function, is searched. Then the minimum and maximum bounds for each data row and data column are stored into a data structure. In addition, a flag is stored for each data row and data column to mark those data rows and data columns that do not contain any visible voxels. Such invisible data rows and data columns can quickly be skipped during rendering depending on this flag. Since the visibility of voxels is dependent on the user-specified transfer function, this process must be repeated once the transfer function changes.

According to an aspect of the invention, there is provided a method for volume rendering a digitized image, the method including providing a pair of adjacent 2-dimensional images of texture data, identifying a plurality of polygons extending in slabs between said adjacent two dimensional textures, finding the first and last visible voxel for the data rows and data columns of each said polygon, wherein the minimum and maximum bounds of each data row and for each data column are determined, marking those data rows and data columns as invisible that do not contain any visible voxels, and rendering said polygons along a direction orthogonal to a dominant viewing direction, wherein rendering of texture data is restricted by the outer bounds of said polygons that are trimmed to the minimum and maximum bounds of two neighboring data rows or data columns, and wherein those data rows and data columns marked as invisible are skipped.

According to a further aspect of the invention, the 2-D images are slice subsets of a 3D digitized image comprising a plurality of intensities corresponding to a domain of points on a 3-dimensional grid.

According to a further aspect of the invention, finding the first and last visible voxel for the data rows and data columns of each polygon comprises, providing a transfer function, for each data row, applying said transfer function to each voxel starting from the beginning of the row until a first visible voxel is found, and applying said transfer function to each voxel starting from the end of the row until a last visible voxel is found, saving the minimum and maximum bounds of each said row that enclose the visible voxls of the data row, for each data column, applying said transfer function to each voxel starting from the beginning of the column until a first visible voxel is found, and applying said transfer function to each voxel starting from the end of the column until a last visible voxel is found, and saving the minimum and maximum bounds of each said column that enclose the visible voxels of the data column, wherein a voxel is visible if its opacity value determined by said transfer function is greater than a predetermined value $\epsilon \geq 0$.

According to a further aspect of the invention, rendering said polygons further comprises, for each polygon, obtaining said saved minimum and maximum bounds of each row of the polygon, obtaining said saved minimum and maximum bounds of each column of the polygon, trimming the polygon to the minimum and maximum bounds of the data rows and data columns, and rendering said polygons, wherein rendering comprises interpolating for each polygon data from intersections of the polygons with adjacent two dimensional images, and interpolating polygons between the images.

According to a further aspect of the invention, the method comprises subdividing said plurality of polygons into multiple smaller polygons wherein space skipping of interior structures of said image is enabled.

According to a further aspect of the invention, the method comprises generating a quad polygon from said minimum and maximum bounds of each said row and column, and sending said quad polygon to a graphics processing unit for rasterization.

According to a further aspect of the invention, the method comprises storing a trimmed polygon in memory associated with a graphics processing unit prior to rendering.

According to a further aspect of the invention, the method comprises storing a stack of untrimmed slab polygons in a memory associated with a graphics processing unit, storing minimum and maximum bounds for each said row and column in a vertex texture of said graphics processing unit, and using minimum and maximum bounds for trimming said stack of untrimmed polygons in a vertex unit of said graphics processing unit.

According to a further aspect of the invention, the method comprises providing a plurality of slabs for rendering, each slab comprising a predetermined number of sequential slices, each slice comprising a plurality of intensities corresponding to a domain of points on a 2-dimensional grid, wherein each slab is represented by a plurality of polygons, and trimming said plurality of polygons to the outer bounds of a plurality of neighboring data rows or data columns of said slab.

According to another aspect of the invention, there is provided a program storage device readable by a computer, tangibly embodying a program of instructions executable by the computer to perform the method steps for volume rendering a digitized image.

DETAILED DESCRIPTION OF THE PREFERRED EMBODIMENTS

Figure 1:
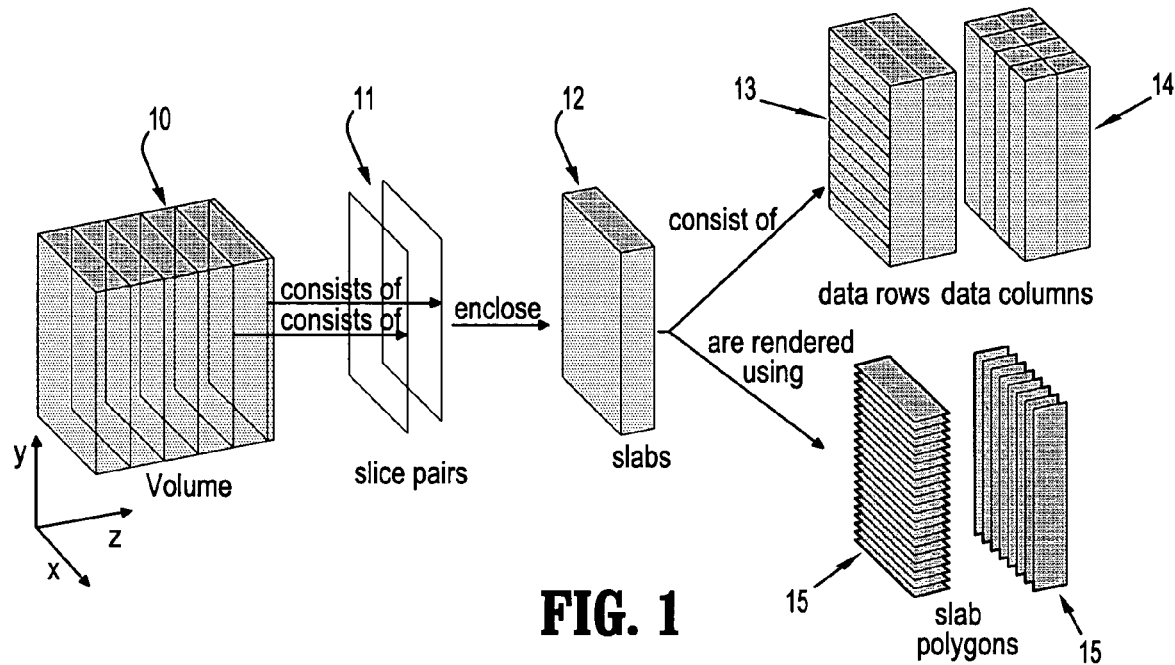
FIG. 1 illustrates terminology used herein below, according to an embodiment of the invention.

Exemplary embodiments of the invention as described herein generally include systems and methods for trimmed slab polygon based empty space skipping. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

FIG. 1 illustrates terminology used herein below in describing representative embodiemnts of the invention. The volume 10 includes slices 11, two adjacent slices enclose a volume slab 12, a volume slab includes two sets of data rows 13 and two sets of data columns 14, and each slab is rendered using slab polygons 15. Thus, according to an embodiment of the invention, each stack of slabs can be considered as either two sets of data rows or two sets of data columns, and each slab can be rendered using either two data rows or two data columns Accordance to an embodiment of the invention, a three-dimensional volume array of data can be assembled from a regular succession of adjacent "slices" through the solid body being scanned, where each slice is a two-dimensional image array of data points. The derivation of such three-dimensional volume array is well known in the art and readily obtainable using systems such as Magnetic Resonance (MR) imaging systems, Computed Tomography (CT) scanning systems, Positron Emission Tomography (PET), and Ultrasound scanning. Each grid value of a two-dimensional image array is known as picture element, or "pixel", while each grid value of a three-dimensional volume array is known as a volume element, or "voxel".

Methods to generate a two-dimensional image from volumetric data can roughly be classified into indirect and direct volume rendering techniques. While indirect methods generate and render an intermediate representation of the volume data, direct methods display the voxel data by evaluating an optical model which describes how the volume emits, reflects, scatters, absorbs and occludes light. The voxel values are mapped to physical quantities which describe light interaction at the respective points in 3D-space. During image synthesis the light propagation is computed by integrating light interaction effects along viewing rays based on the optical model. The corresponding integral is known as the volume rendering integral.

Sliding texture volume rendering is an object-order volume rendering approach that allows for direct volume visualization of a large three-dimensional volume data set composed of a series of parallel images. The series of parallel images contains data values representing the interior of a three-dimensional volume, such as data from Computed Tomography (CT) scanners. The method works by progressively sliding over the series of 2D images, rendering the space between the two current adjacent images. For that purpose, two adjacent images of the volume are copied into two 2D memory arrays residing in CPU or GPU (Graphics Processing Unit) memory. The space in between the two images is rendered by a CPU or GPU by rasterizing slab polygons that are textured using interpolated voxel values obtained from the two images of the volume.

In contrast to traditional 2D texture based volume rendering algorithms, the sliding texture approach does not require three copies of the volume data to be stored. The volume data can be represented in its' original form, as a single series of two-dimensional images. The contents of each image should be contiguous to ensure good cache coherency, however it is not necessary that the series of images be contiguous in memory. Furthermore, it is not necessary for either all of the data to reside in main memory, or for the slices to have uniform scaling and inter-slice distance.

According to an embodiment of the invention, the slab polygon geometry used for sliding texture based volume rendering is used directly to allow empty space skipping. Consequently it is not necessary to introduce an even finer tessellation of the slab polygon geometry for space skipping. The tightest fit of the slab polygons around the visible part of the volume is determined for every new transfer function.

Figure 2:
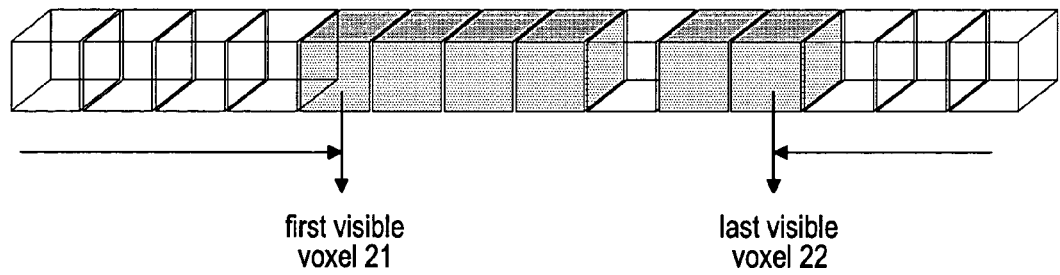
FIG. 2 schematically illustrates finding the first and last voxels of volume data columns and rows that are visible, according to an embodiemnt of the invention.

Each time the transfer function changes, the tightest fit of the slab polygons around the object must be found. For this purpose, the first and last visible voxel along two neighboring data rows or data columns of voxels along the x- and y-directions is determined in a pre-processing step. This information along with a visibility flag for the each data row and data column is stored into a data structure. FIG. 2 schematically illustrates finding the first 21 and last 22 voxels of volume data columns and rows that are visible. These two voxels 21, 22 determine the minimum and maximum bounds of the volume data row or column.

Figure 5:
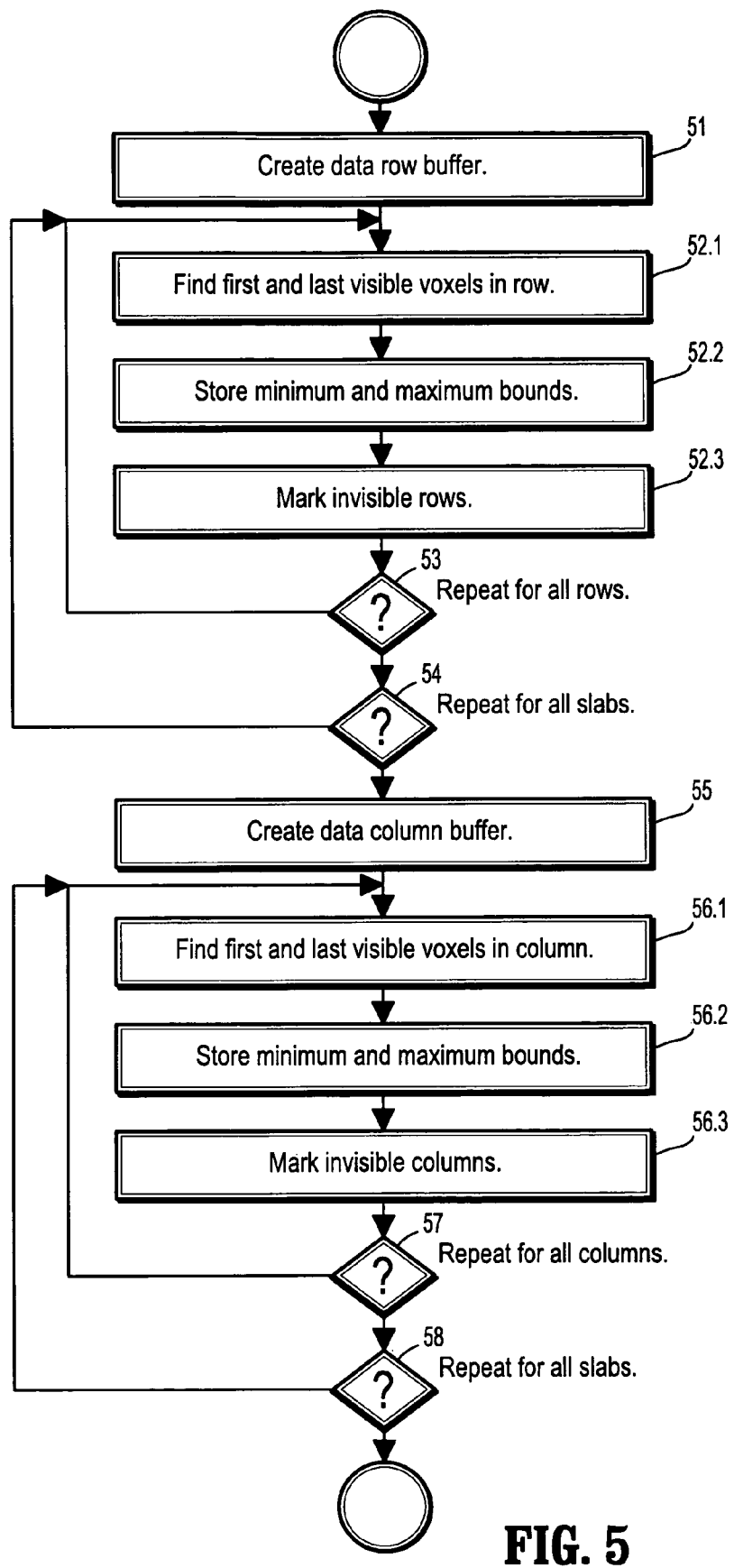
FIG. 5 is a flowchart of a pre-processing step, according to an embodiment of the invention.

A flowchart of a pre-processing step according to an embodiment of the invention is presented in FIG. 5. Referring now to the figure, a data row buffer is created at step 51. Then for all slabs, and for all volume data rows within each slab, the transfer function is applied at step 52.1 to all voxels along the data row to find the first and last voxels along the x-direction that are visible. Each row is searched from the beginning until the first visible voxel is found, and from the end until the last visible voxel is found. According to an embodiment of the invention, a voxel is visible if its opacity value as determined by the transfer function is greater than a predetermined value $\epsilon \geq 0$. The minimum and maximum bounds of the data row that enclose the visible part of the data row in the data row buffer are stored at step 52.2. Data rows that do not contain any visible voxels in the data row buffer are marked at step 52.3 as not visible. The pre-processor loops back through all rows at step 53, and loops thorough all slabs at step 54. At step 55, a data column buffer is created. Then, for all slabs and for all volume data columns within each slab, the transfer function is applied at step 56.1 to all voxels along the data column to find the first and last voxels along the y-direction that are visible. Similar to the data row searching, each column is searched from the beginning until the first visible voxel is found, and from the end until the last visible voxel is found. The minimum and maximum bounds of the data column that enclose the visible part of the data column in the data column buffer are stored at step 56.2. Data columns that do not contain any visible voxels in the data column buffer are marked at step 56.3 as not visible. The pre-processor loops back through all columns at step 57, and loops thorough all slabs at step 58. In most cases it is not necessary to go through the whole volume data to find the minimum and maximum bounds for each volume data row and column, since the rows and columns can be searched from the outside, as indicated in FIG. 2.

Figure 3:
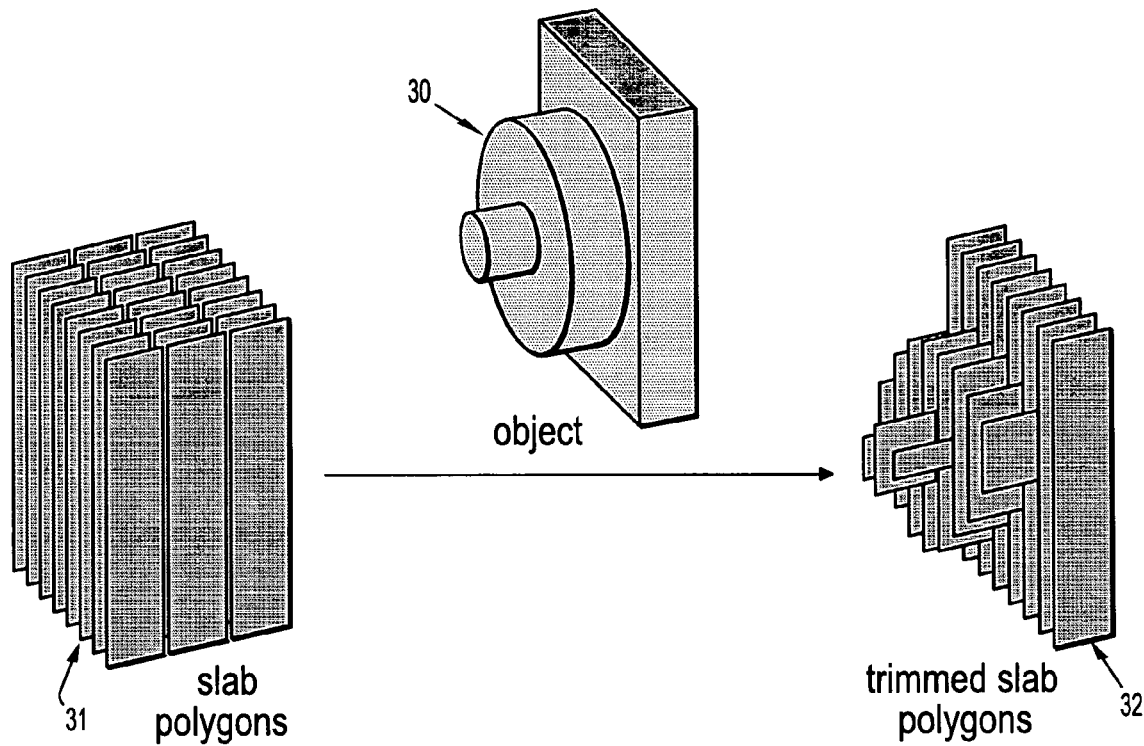
FIG. 3 illustrates how slab polygons are trimmed to fit the outer hull of the object that is rendererd, according to an embodiemnt of the invention.

In principle, the rendering of the trimmed slab polygons is done in the same way as in the original sliding texture volume rendering approach. If the most dominant axis of the viewing direction is z, the original volume slices are rendered. If the x- or y-axis is most dominant, slab polygons that are orthogonal to the most dominant viewing direction are rendered to rasterize slabs. Slabs are rendered in a strict front-to-back or back-to-front order. Depending on the sampling rate, a set of slab polygons, enclosed within a slab, are created for each slab. These slab polygons are rendered in the same order as the slabs (front-to-back or back-to-front). However, before an individual slab polygon is rendered, the visibility stored during preprocessing is checked. If the slab polygon is visible, a slab polygon quad is created. According to an embodiment of the invention wherein a slab includes either two data rows or two data columns, the slab polygon is visible if the two data rows or data columns covering the slab polygon are visible, since data values from both data rows or data columns are interpolated on the slab polygon. Then the minimum and maximum bounds, stored during pre-processing of the two data rows or data columns for the corresponding slab polygon are fetched and the slab polygon is trimmed to the minimum and maximum bounds of both data rows or data columns. FIG. 3 illustrates how slab polygons 31 are trimmed 32 to fit the outer hull of the object 30 that is rendererd, according to an embodiment of the invention. The trimmed slab polygon is rendered as usual.

Figure 6:
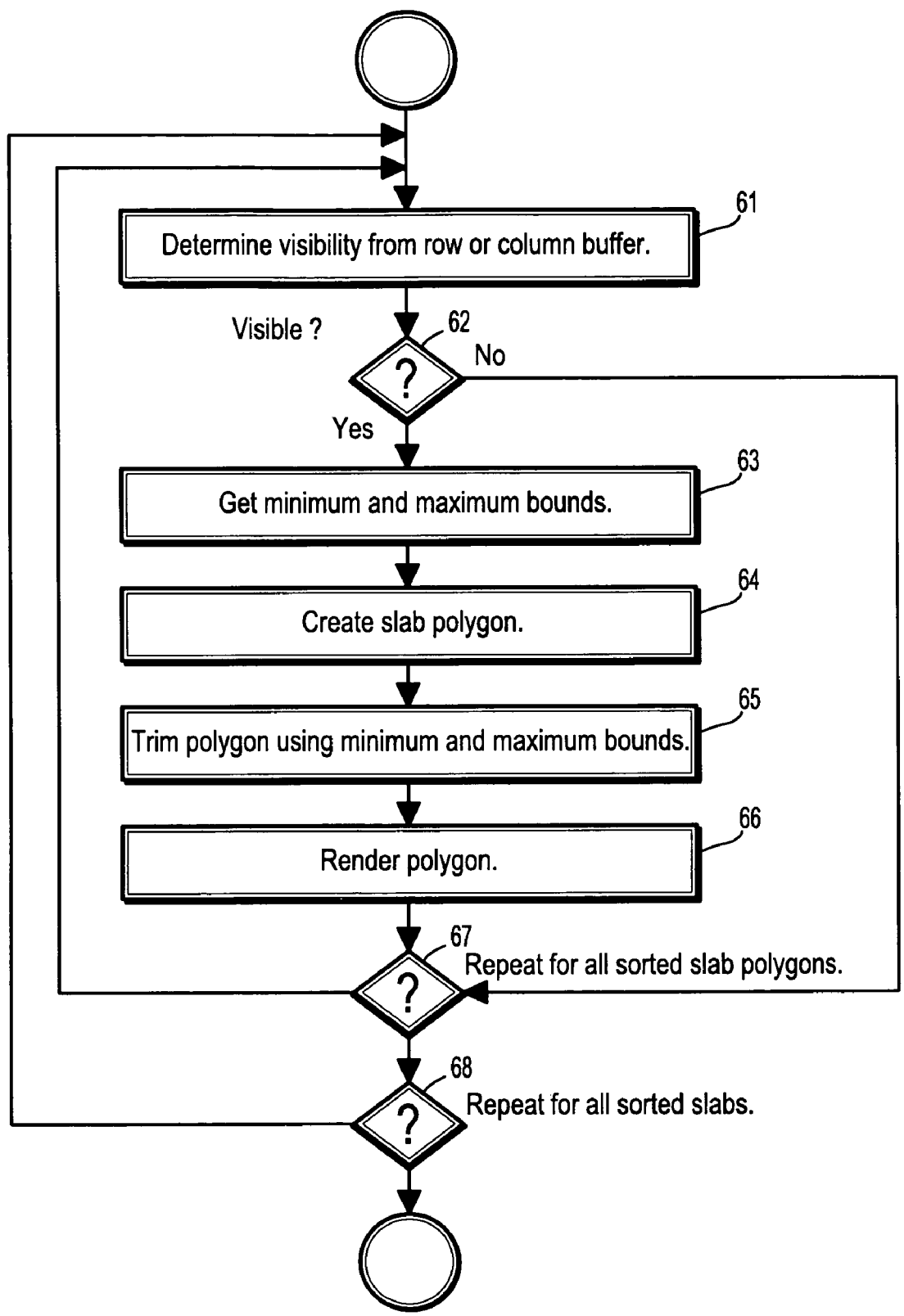
FIG. 6 is a flowchart of a slab rendering algorithm, according to an embodiment of the invention.

A slab rendering algorithm according to an embodiment of the invention is depicted in FIG. 6. Referring now to the flowchart, for all slabs sorted front-to-back (or back-to-front), and for all slab polygons sorted front-to-back (or back-to-front) in each slab, the visibility of the two corresponding data rows or data columns is obtained from the data row or data column buffer at step 61. If, at step 62, one or both data rows or data columns are visible, the minimum and maximum bounds of the data rows or data columns are obtained from the data row or data column buffer at step 63. The slab polygon is created at step 64. At step 65, the slab polygon is trimmed to the minimum and maximum bounds of both data rows or data columns. The slab polygon is rendered at step 66. The rendering process loops back through all slab polygons at step 67, and loops thorough all slabs at step 68.

Depending on the sampling rate, single or multiple slab polygons are created for each volume data row or data column. It should be noted, that empty space inside the object cannot be skipped using this method of an embodiment of the invention. According to another embodiment of the invention, a method can be easily extended by splitting slab polygons into multiple slab segments which cover multiple nonempty ranges inside a slab. This however increases the geometry required to rasterize the slabs.

The rasterization of slab polygons and specifically the interpolation of scalar values on slab polygons is described in detail in "Sliding Texture Volume Rendering", incorporated above.

There are different options in other embodiments of the invention for rendering the trimmed slab polygon geometry on a graphics processing unit (GPU). In the following are listed some the possibilities. In one embodiment of the invention, each time the flag from the pre-processing data structure indicates that a slab polygon is visible, a quad polygon with dimensions obtained from the pre-processing data structure is created and send to the graphics hardware for rasterization. In another embodiment of the invention, a display list or vertex array of all visible slab polygons, already trimmed to the right dimensions, is stored in GPU memory. In another embodiment of the invention, a template slab-polygon stack with untrimmed slab polygons is created for one slab of the volume and stored in GPU memory as a display list or vertex array. The minimum and maximum bound for each slab polygon is stored in a vertex texture. In a vertex program, the minimum and maximum bounds for a slab polygon are fetched from the vertex texture and the polygon is trimmed accordingly. Non-visible slab polygons can be culled with back-face culling, i.e. the vertex coordinates are set in such a way that the slab polygon faces away from the camera.

In contrast to the sliding texture volume rendering approach, the interleaved slice volume rendering approach disclosed in "System and Method for Interleaved Slice Volume Rendering", incorporated above, uses slab polygons that cover three subsequent slabs, i.e. a single stack of slab polygons is used to rasterize the space in between four subsequent volume slices. Consequently, slab polygons cannot be trimmed to the minimum and maximum bounds of two neighboring volume data rows or data columns. Instead, the four subsequent data rows or data columns are taken into account and the minimum and maximum bounds of the slab polygons are based on the minimum and maximum bounds of those four volume data rows or volume data columns. The preprocessing step is done the same way as described for the sliding texture volume rendering approach. During rendering the visibility of the four data rows or columns covering the slab polygon is determined. If any of the rows or columns is visible, the minimum and maximum bounds of the four rows or columns are checked. Slab polygons are trimmed to the minimum and maximum bounds of all the four volume data rows or columns.

Figure 4:
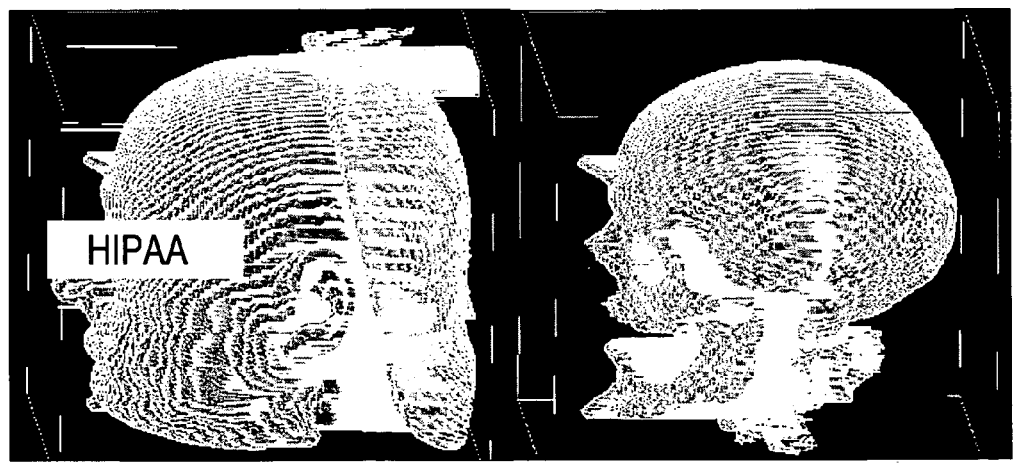
FIG. 4 depicts results of trimmed slab polygon based empty space skipping for two different transfer functions, according to an embodiemnt of the invention.

FIG. 4 depicts two image results of trimmed slab polygon based empty space skipping for two different transfer functions, according to an embodiemnt of the invention. The trimmed slab polygons are visualized with white outlines. Note, that without further subdivision of slab polygons, the interior empty space is not skipped by the method.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
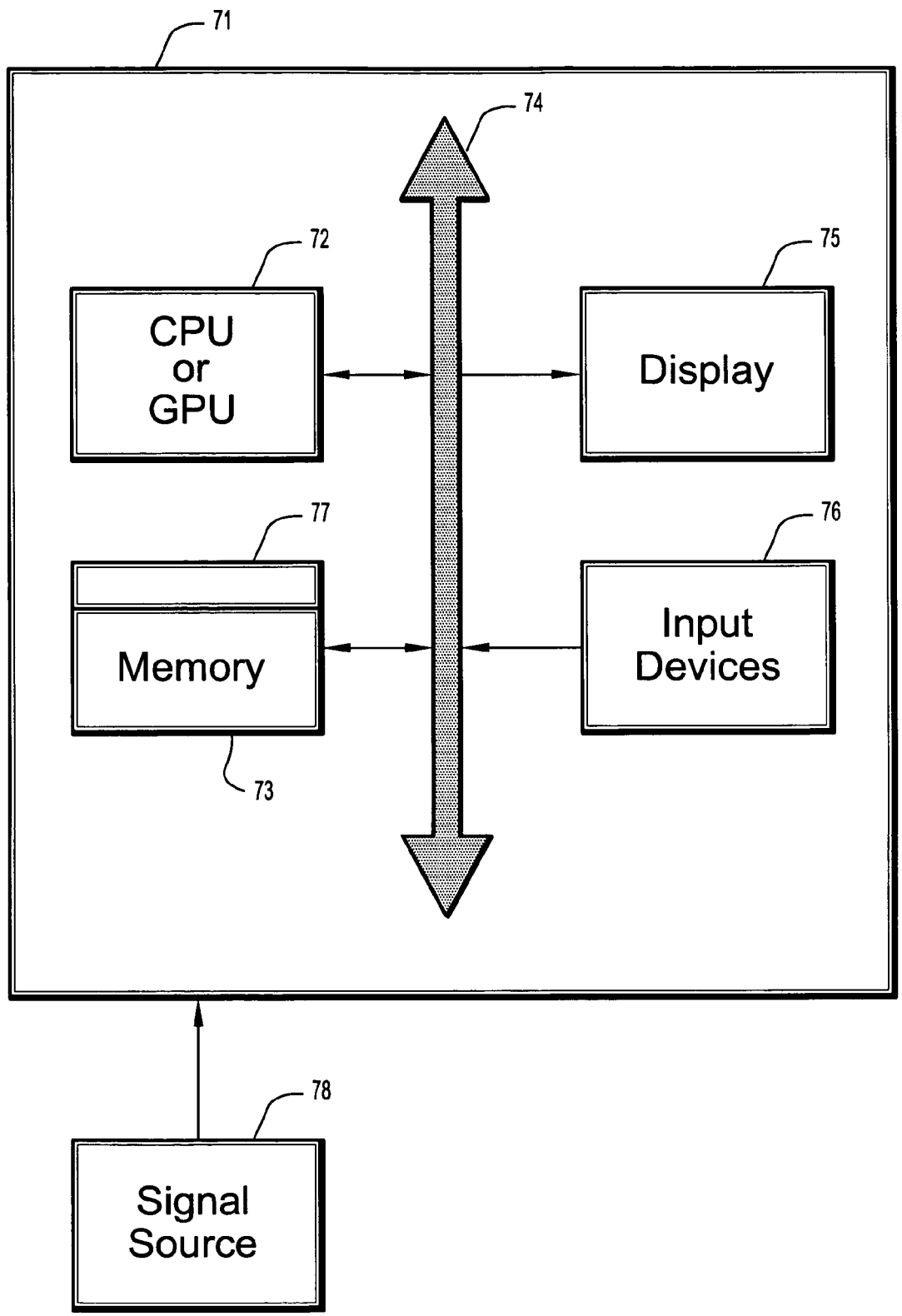
FIG. 7 is a block diagram of an exemplary computer system for implementing a method for trimmed slab polygon based empty space skipping, according to an embodiment of the invention.

FIG. 7 is a block diagram of an exemplary computer system for implementing a method for trimmed slab polygon based empty space skipping, according to an embodiment of the invention. Referring now to FIG. 7, a computer system 71 for implementing the present invention can comprise, inter alia, a central processing unit (CPU) (or graphical processing unit (GPU)) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer-implemented method of volume rendering a digitized image, comprising the steps of:

providing a pair of adjacent 2-dimensional images of texture data;

identifying a plurality of polygons extending in slabs between said adjacent two dimensional textures;

finding a first and last visible voxel for data rows and data columns of each said polygon, wherein a minimum and maximum bound of each data row and for each data column are determined;

marking those data rows and data columns as invisible that do not contain any visible voxels; and rendering said polygons along a direction orthogonal to a dominant viewing direction, wherein rendering of texture data is restricted by the outer bounds of said polygons that are trimmed to the minimum and maximum bounds of two neighboring data rows or data columns, and wherein those data rows and data columns marked as invisible are skipped, wherein said steps of identifying a plurality of polygons, finding a first and last visible voxel, marking data rows and data columns, and rendering said polygons, are performed by a graphics processing unit.

2. The method of claim 1, wherein said 2-D images are slice subsets of a 3D digitized image comprising a plurality of intensities corresponding to a domain of points on a 3-dimensional grid.

3. The method of claim 1, wherein finding the first and last visible voxel for the data rows and data columns of each polygon comprises:
provide a transfer function;
for each data row, applying said transfer function to each voxel starting from the beginning of the row until a first visible voxel is found, and applying said transfer function to each voxel starting from the end of the row until a last visible voxel is found;
saving the minimum and maximum bounds of each said row that enclose the visible voxels of the data row;
for each data column, applying said transfer function to each voxel starting from the beginning of the column until a first visible voxel is found, and applying said transfer function to each voxel starting from the end of the column until a last visible voxel is found; and
saving the minimum and maximum bounds of each said column that enclose the visible voxels of the data column, wherein a voxel is visible if its opacity value determined by said transfer function is greater than a predetermined value $\epsilon \geq 0$.

4. The method of claim 1, wherein rendering said polygons further comprises, for each polygon:
obtaining said saved minimum and maximum bounds of each row of the polygon;
obtaining said saved minimum and maximum bounds of each column of the polygon;
trimming the polygon to the minimum and maximum bounds of the data rows and data columns; and
rendering said polygons, wherein rendering comprises interpolating for each polygon data from intersections of the polygons with adjacent two dimensional images, and interpolating polygons between the images.

5. The method of claim 1, further comprising subdividing said plurality of polygons into multiple smaller polygons wherein space skipping of interior structures of said image is enabled.

6. The method of claim 3, further comprising generating a quad polygon from said minimum and maximum bounds of each said row and colunm, and sending said quad polygon to said graphics processing unit for rasterization.

7. The method of claim 1, further comprising storing a trimmed polygon in memory associated with said graphics processing unit prior to rendering.

8. The method of claim 1, further comprising storing a stack of untrimmed slab polygons in a memory associated with said graphics processing unit, storing minimum and maximum bounds for each said row and colunm in a vertex texture of said graphics processing unit, and using minimum and maximum bounds for trimming said stack of untrimmed polygons in a vertex unit of said graphics processing unit.

9. The method of claim 1, further comprising providing a plurality of slabs for rendering, each slab comprising a predetermined number of sequential slices, each slice comprising a plurality of intensities corresponding to a domain of points on a 2-dimensional grid, wherein each slab is represented by a plurality of polygons, and trimming said plurality of polygons to the outer bounds of a plurality of neighboring data rows or data columns of said slab.

10. A computer-implemented method of volume rendering a digitized image, comprising the steps of:
providing a pair of adjacent 2-dimensional images of texture data;
identifying a plurality of polygons extending in slabs between said adjacent two dimensional textures;
finding a first and last visible voxel for data rows and data columns of each said polygon, saving an associated minimum and maximum bounds of each data row and for each data column; and
trimming the polygon to the minimum and maximum bounds of the data rows and data columns; and
rendering said polygons along a direction orthogonal to a dominant viewing direction, wherein rendering comprises interpolating for each trimmed polygon data from intersections of the polygons with adjacent two dimensional polygons, and interpolating between the polygons of the plurality of polygons,
wherein said steps of identifying a plurality of polygons, finding a first and last visible voxel, saving an associated minimum and maximum bound, trimming the polygon, and rendering said polygons are performed by a graphics processing unit.

11. The method of claim 10, further comprising marking those data rows and data columns as invisible that do not contain any visible voxels; and
skipping during rendering those data rows and data columns marked as invisible by skipping the corresponding slab polygons.

12. A program storage device readable by a computer, tangibly embodying a program of instructions executable by the computer to perform the method steps for volume rendering a digitized image, said method comprising the steps of:
providing a pair of adjacent 2-dimensional images of texture data;
identifying a plurality of polygons extending in slabs between said adjacent two dimensional textures;
finding a first and last visible voxel for data rows and data columns of each said polygon, wherein a minimum and maximum bound of each data row and for each data column are determined;
marking those data rows and data columns as invisible that do not contain any visible voxels; and
rendering said polygons along a direction orthogonal to a dominant viewing direction, wherein rendering of texture data is restricted by the outer bounds of said polygons that are trimmed to the minimum and maximum bounds of two neighboring data rows or data columns, and wherein those data rows and data columns marked as invisible are skipped.

13. The computer readable program storage device of claim 12, wherein said 2-D images are slice subsets of a 3D digitized image comprising a plurality of intensities corresponding to a domain of points on a 3-dimensional grid.

14. The computer readable program storage device of claim 12, wherein finding the first and last visible voxel for the data rows and data columns of each polygon comprises:
providing a transfer function;
for each data row, applying said transfer function to each voxel starting from the beginning of the row until a first visible voxel is found, and applying said transfer function to each voxel starting from the end of the row until a last visible voxel is found;
saving the minimum and maximum bounds of each said row that enclose the visible voxels of the data row;
for each data column, applying said transfer function to each voxel starting from the beginning of the column until a first visible voxel is found, and applying said transfer function to each voxel starting from the end of the column until a last visible voxel is found; and
saving the minimum and maximum bounds of each said colunm that enclose the visible voxels of the data column, wherein a voxel is visible if its opacity value determined by said transfer function is greater than a predetermined value $\epsilon \geq 0$.

15. The computer readable program storage device of claim 12, wherein rendering said polygons further comprises, for each polygon:
   obtaining said saved minimum and maximum bounds of each row of the polygon;
   obtaining said saved minimum and maximum bounds of each column of the polygon;
   trimming the polygon to the minimum and maximum bounds of the data rows and data columns; and
   rendering said polygons, wherein rendering comprises interpolating for each polygon data from intersections of the polygons with adjacent two dimensional images, and interpolating polygons between the images.

16. The computer readable program storage device of claim 12, the method further comprising subdividing said plurality of polygons into multiple smaller polygons wherein space skipping of interior structures of said image is enabled.

17. The computer readable program storage device of claim 14, the method further comprising generating a quad polygon from said minimum and maximum bounds of each said row and column, and sending said quad polygon to a graphics processing unit for rasterization.

18. The computer readable program storage device of claim 12, the method further comprising storing a trimmed polygon in memory associated with a graphics processing unit prior to rendering.

19. The computer readable program storage device of claim 12, the method further comprising storing a stack of untrimmed slab polygons in a memory associated with a graphics processing unit, storing minimum and maximum bounds for each said row and column in a vertex texture of said graphics processing unit, and using minimum and maximum bounds for trimming said stack of untrimmed polygons in a vertex unit of said graphics processing unit.

20. The computer readable program storage device of claim 12, the method further comprising providing a plurality of slabs for rendering, each slab comprising a predetermined number of sequential slices, each slice comprising a plurality of intensities corresponding to a domain of points on a 2-dimensional grid, wherein each slab is represented by a plurality of polygons, and trimming said plurality of polygons to the outer bounds of a plurality of neighboring data rows or data columns of said slab.

* * * * *